May 19, 1970 — S. ZAROMB — 3,513,031
GAS-DEPOLARIZED CELL WITH ALUMINUM ANODE
Original Filed March 23, 1964
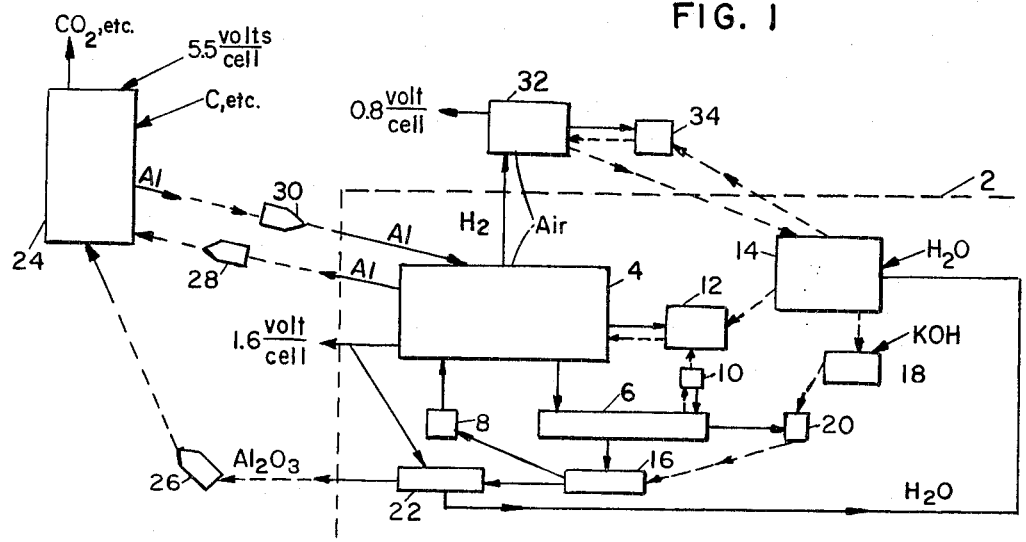
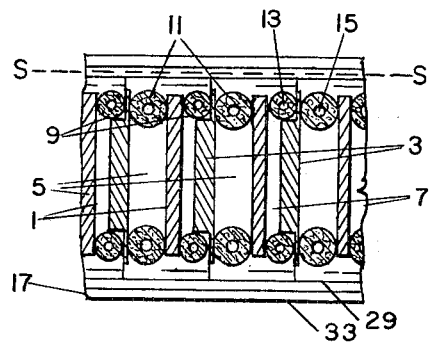
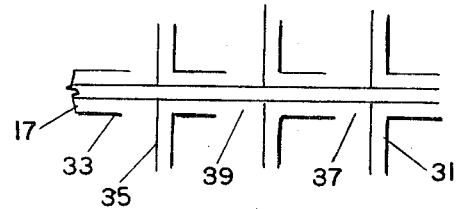
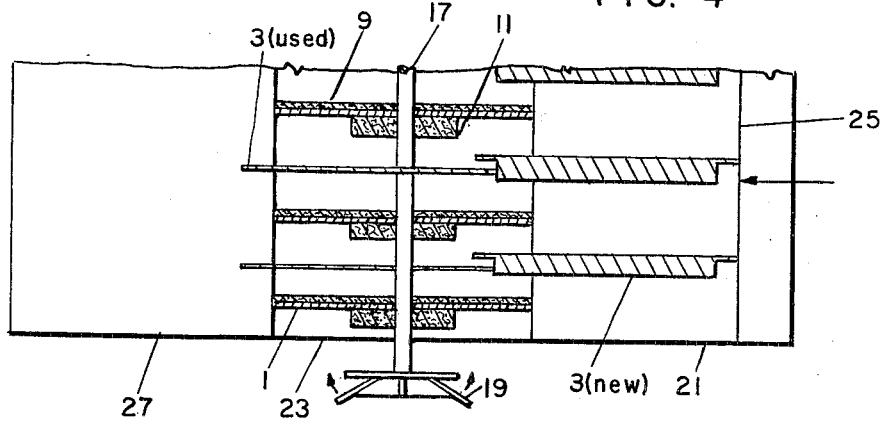
INVENTOR.
SOLOMON ZAROMB

United States Patent Office 3,513,031
Patented May 19, 1970

3,513,031
GAS-DEPOLARIZED CELL WITH ALUMINUM ANODE
Solomon Zaromb, 376 Monroe St., Passaic, N.J. 07055
Continuation of application Ser. No. 354,084, Mar. 23, 1964. This application July 27, 1967, Ser. No. 656,595
Int. Cl. H01m 27/00, 27/12
U.S. Cl. 136—86     2 Claims

ABSTRACT OF THE DISCLOSURE

An alkaline aluminum-air power source is disclosed comprising an electrolyte reservoir; electrolyte circulation means, means for removing the reaction product and for replacing the anodes, and means of inhibiting corrosion of said anodes through provisions for withdrawal of electrolyte from battery cells on shut-off and for maintaining a current density in excess of 10 milliamperes/cm.[2] during operating periods.

--- thereby reducing air pollution in congested areas and preserving storable fossile fuel resources.

Briefly, my invention consists in providing simple means of electro-chemically reacting aluminum with air and water in a controllable manner so as to yield useful electrical energy plus aluminum hydroxide, continuously removing and hydroxide and returning it for the production of fresh aluminum, and repetitively or continuously introducing such fresh aluminum and/or water or electrolyte so as to permit operation for an indefinitely long time.

My invention is best explained with reference to Table I and to the drawing, in which:

FIG. 1 is a schematic flow diagram for the processes based on the reactions listed in Table I;

FIG. 2 is a schematic view of a horizontal cross-section of a part of the aluminum-air battery pile;

FIG. 3 is a partial schematic view of section S—S perpendicular to the plane of FIG. 2; and FIG. 4 is a schematicpartial top view of the pile of FIG. 2 in a "re-fueling" stage.

TABLE I.—BASIC REACTIONS

| | | | | Voltages | | |
|---|---|---|---|---|---|---|
| | | | | | Actual | |
| No. | Description or Function | Chemical Equation | Theoretical | Input | Output |
|---|---|---|---|---|---|
| 1 | Anode | $(Al + 4OH^- \rightarrow Al(OH)_4^- + 3e^-) \times 4$ | 2.35 | | |
| 2 | Cathode | $(O_2 + 2H_2O + 4e^- \rightarrow 4OH^-) \times 3$ | 0.40 | | |
| 3 | Battery reaction | $Al + 3O_2 + 4OH^- + H_2O \rightarrow 4Al(OH)_4^-$ | 2.75 | | $1.5 \pm 0.3$ |
| 4 | Electrolyte regeneration | $(Al(OH)_4^- \rightarrow Al(OH)_3 + OH^-) \times 4$ | Negligible | | |
| 5 | Over-all reaction | $4Al + 3O_2 + 6H_2O \rightarrow 4Al_2(OH)_3$ | (ca.) 2.8 | | $1.5 \pm 0.3$ |
| 6 | Dehydration | $4Al(OH)_3 \rightarrow 2Al_2O_3 + 6H_2O$ | $\leq |-0.3|$ | $-0.4 \pm 0.1$ | |
| 7 | Reduction | $2Al_2O_3 + 3C \rightarrow 4Al + 3CO_2$ | ca. $-1.7$ | $-5.5$ | |
| 8 | Corrosion | $Al + 3H_2O + OH^- \rightarrow Al(OH)_4^- + 3H_2$ | 1.5 | | 0-0.9 |

---

This application is a continuation of application Ser. No. 354,084 filed Mar. 23, 1964 and now abandoned.

This invention relates to an aluminum-air battery and to the apparatus and methods associated therewith.

Although aluminum has been known to have highly attractive potentialities as a battery anode material, it has thus far not found any significant practical application in a commercial battery.

It is the purpose of my invention to provide an aluminum-air battery for use in locomotion and other widespread applications.

It is also a purpose of the invention to provide a compact, fireproof, and otherwise safe means of storing large means of storing large amounts of "fuel" or chemical energy readily convertible into electricity.

It is a further purpose of my invention to provide the means of producing economically practical electric automobiles and other vehicles capable of running over long distances without "re-fueling," being relatively compact, noiseless and fireproof, and not emitting any air pollutants.

It is another object of the invention to provide a means of utilizing aluminum as a practical "fuel."

It is yet another purpose of the invention to provide a method of indirectly utilizing nuclear energy and/or nonstorable hydro-electric power for locomotive applications In FIG. 1, the essential lower right-hand section is marked off by a dotted line from the complementary upper and left-hand sections. The large rectangle 4 in the upper left-hand corner of said lower section represents the aluminum-air battery pile of FIG. 2 based on reactions 1 through 5 of Table I.

In FIG. 2 is shown a section of said battery pile 4 comprising alternating air-cathodes 1 and aluminum anodes 3 separated by alternating gaps of air 5 and electrolyte 7. The widths of said gaps are determined by alternating spacing gaskets 9 and air-gap spacers 11, said gaskets and spacers being of tubular material hydraulically expandible and collapsible by means of fluids contained in their internal tubulatures 13 and 15.

Each gasket 9 covers the perimeter of its adjacent anode-cathode pair, thus forming together with said pair a nearly complete enclosure for electrolyte 7. Inlets and outlets (not shown) into and out of said enclosure may be effected either in torus-like sections of gaskets 9 or, preferably, by means of tubes (not shown) entering into cathode 1 near its lower and upper edges.

As is well known, a tubular expandible material such as gaskets and spacers 9 or 11 will expand when the pressure of fluid within internal tubulatures 13 or 15 exceeds the ambient pressure, and will collapse when said internal pressure is reduced below the ambient pressure. Such hydraulic control can be effected by numerous means.

Electrolyte 7 consists mainly of 2 to 5 moles NaOH or KOH, preferably KOH, per liter of water, plus corrosion-inhibiting additives such as at least 0.1 mole/liter ZnO and/or approximately 1 weight-percent of a long-chain derivative of tetramethyl or trimethylbenzyl ammonium hydroxide, wherein said long chain, preferably an alkyl or alkoxy radical containing 12 to 16 carbon atoms, replaces either a methyl radical or one of the hydrogen atoms in the benzyl radical.

Significant improvements in the corrosion and/or polarization behavior of anodes 3 may be realized by pre-alloying the aluminum with up to approximately 0.1% mercury and/or up to 10% zinc, magnesium or silicon. Typical formulae for such alloys may be 95% Al plus 4 to 5% Zn plus 0.05 to 0.1% Hg, or 90–95% Al plus 5 to 10% Mg plus 0.05 to 0.12% Hg.

The rim 29 of anode 3 covered by gasket 9 is much thinner than the part exposed to the electrolyte so as to permit adjustment of the electrolyte gap as said exposed part is gradually eaten away by battery reactions. Said adjustment is effected most conveniently as part of the power shut-off and start-up operations. In the shut-off step, the electrolyte is drained from battery pile 4 into an electrolyte reservoir 6 (FIG. 1) by switching off the pump 8 and filtering means 16. This draining step is accelerated by collapsing gaskets 9 and expanding spacers 11 so as to bring the counter-electrodes together and force out most of the electrolyte. Said counter-electrodes are then separated by a pre-determined distance either during shut-off or before start-up by effecting a pre-determined partial expansion of gaskets 9 and simultaneous partial collapse of spacers 11.

Gaskets 9 and spacers 11 are also useful in the "refueling" step depicted schematically in FIG. 4. However, an auxiliary separating device 17 is also required for this step. Said step consists of:

(a) Withdrawing electrolyte 7 into reservoir 6 as in the afore-outlined shut-off;

(b) Collapsing spacers 11 and freeing used anodes 3 from gaskets 9 by means of separating device 17;

(c) Aligning new anodes 3 on platform 21 against the used anodes 3 on platform 23, pushing the new anodes into position by means of board 25, and collecting the used anodes in basket 27 as indicated in FIG. 4; and (d) Releasing lever 19 of device 17, expanding spacers 11 until the new anodes press against their counter-electrodes, and expanding gaskets 9 until a seal is formed around the rims 29.

In step (b), the flanges 31 of separating device 17 are first wedged in deeper between gaskets 9 and rims 29 of the used anodes 3, said flanges 31 being affixed to the outer tube 33 of device 17 (FIG. 3). Flanges 35, affixed to a telescoping inner rod or tube 37, are then caused to move along slots 39 in outer tube 33 by actuating lever 19 (FIG. 4), thereby effecting the desired separation of anodes 3 from gaskets 9.

Both the gaskets 9 and the spacers 11 may be permanently bonded to air-cathodes 1. Said cathodes may consist of properly impregnated porous plates of carbon, such as are commercially available, or of nickel, such as are also well known, or of conductive tin oxide-coated glass or ceramic materials, such as are described in my co-pending application Ser. No. 318,125, filed Oct. 22, 1963.

The parts of spacers 11 adjacent to anodes 3 and cathodes 1 may also comprise electrical contacts (not shown) which may electrically connect successive cells of pile 4 in series or in parallel depending on power requirements.

Each cell in pile 4 has at least one electrolyte inlet, at least one electrolyte outlet, and at least one gas venting valve. At start-up, each cell is first filled directly from the electrolyte reservoir 6 (FIG. 1) by actuating a manual or foot control 10, which may comprise a one-way valve and a piston (not shown) whose depth of travel is controlled by liquid level sensor 12. The same sensor also controls the replenishment of water from water reservoir 14 into electrolyte reservoir 6 during continuous operation. Electrolyte circulation is effected immediately after start-up by actuating filtering means 16 and pump 8, said filtering means being preferably of a continuous type such as described in my co-pending application Ser. No. 293,-446, filed July 8, 1963, now Patent No. 3,207,061. To eliminate the possibility of clogging by fine $Al(OH)_3$ particles, filtering means 16 may be occasionally reverse-flushed with some concentrated KOH solution from reservoir 18, which is filled with solid KOH plus a nearly saturated KOH solution, said solution being replenished with water from reservoir 14. This reverse-flushing should be required quite rarely, only if and when the electrolyte becomes depleted and its concentration drops below its optimum value of between 2 and 5 moles/liter, as measured by a conductivity and/or density sensor 20. Usually, however, the filtrate from filtering means 16 is forced by pump 8 into the individual cells in pile 4, while electrolyte carrying $Al(OH)_3$ from each cell is forced back into reservoir 6, where the $Al(OH)_3$ is allowed to precipitate spontaneously and thence in form of an electrolyte-

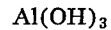

$Al(OH)_3$ slurry it is sucked back into filtering means 16.

The nearly dry $Al(OH)_3$ extruded from filtering means 16 may be either stored in a collecting compartment and returned for credit in hydrated form, or it may be thermally dehydrated first in oven 22. The heat input into dehydrating means 22, which may amount to about 25% of the energy derived from pile 4, may be supplied from the otherwise completely wasteful braking and idling stages during continuous operation. The water removed from means 22 may be returned to reservoir 14, thus minimizing water replenishment needs, while the $Al_2O_3$ product may be collected and returned together with used Al anodes via transportation means 26 or 28 to an Al reduction and casting plant 24, whence fresh Al anodes return to pile 4 via transportation means 30.

When the battery is operating at or above a current density of 10 milliamperes/cm.$^2$ hereinafter referred to as "high" current density, the corrosion reaction 8 of Table I may be held to much less than that of battery reaction 3, especially with the aid of the afore-mentioned corrosion inhibitors. At lower current drains, however, the rate of hydrogen evolution from reaction 8 may be quite high. Moreover, said evolution may still be appreciable even at the higher current densities. In order to recover the energy contained in the evolved hydrogen, the latter is fed into a hydrogen-air fuel cell 32, which serves as an auxiliary energy storage and power supply means. Fuel cell 32 may also serve either by itself or in conjunction with dehydrating means 22 as a useful outlet for the Al battery power during idling and/or breaking periods, thus maintaining a high current density in pile 4 and minimizing corrosion therein. If fuel cell 32 is of an ion-exchange type, then any excess water formed therein may be returned to reservoir 14. Alternately, liquid level control 34 may cause water to return from reservoir 14 when hydogen is generated in cell 32 or when water has been lost therefrom by evaporation.

Having now specified the components of FIGS. 1, 2, 3, and 4, and their mode of operation, I shall now proceed to an estimate of the over-all inputs and outputs, according to Table I and FIG. 1, and of the over-all weight and volume per watt-hour of energy output. In plant 24, approximately 0.5 gram carbon plus 60,000 joules of energy is consumed for each gram of aluminum reduced. On the other hand, for a net output of approximately 1 volt/cell (taking into account the energy consuming dehydration reaction 6) and an overall current efficiency of only 80%, about 9,000 joules is delivered by pile 4 for each gram of aluminum. This yields an over-all energy conversion efficiency of about 15% neglecting the carbon and of about 12% including the combustion energy of carbon. Considering that these values are comparable to the overall efficiencies of gasoline engines, and that both carbon and hydro-electric energy are cheaper and (at least potentially) more abundant than petroleum fuels, it is apparent that the above-outlined process should offer marked economic advantages and result in tremendous savings of fuel resources.

It is also found from Table I and from chemical handbooks that the net product of reactions 1 through 6, $Al_2O_3$, weighs approximately twice as much and has about the same volume as the reacted aluminum. Moreover, when a large amount of energy is to be consumed without intermediate re-fueling, the weight of all the other components directly associated with pile 4 becomes less than that of the finally accumulated $Al_2O_3$ product, i.e., the total weight becomes less than 4 times that of the reacted aluminum. Similarly, the volume of all said other components also becomes less than the combined volumes of the initial aluminum and the final $Al_2O_3$ product, i.e., the total volume again becomes less than 4 times that of the fresh aluminum anodes. Hence, for the afore-estimated yield of 9,000 joules per gram of aluminum, one obtains an overall energy to weight ratio of more than 2,250 kilojoules per kilogram or more than 300 watt-hours/lb., and an energy to volume ratio of at least 6,000 joules/cm.$^3$ or at least 26 watt-hours/cu. in. For instance, a 10-kilowatt power supply operating without "refueling" at full power for 60 hours can weigh less than a ton and occupy a total volume of less than 13 cubic feet. The aluminum-air battery thus provides exceptional compactness in addition to the afore-outlined advantages of fuel economoy, safety, reduced air-pollution, and so on.

There will now be obvious to those skilled in the art many modifications and variations of the afore-described battery and associated apparatus and processes, which will not depart, however, from the scope of the invention if outlined by the following claims.

I claim:
1. Power source comprising aluminum anodes and oxygen-depolarized cathodes forming parts of battery cell compartments, a strongly alkaline aqueous electrolyte, an electrolyte reservoir, electrolyte circulation means, means for removing the aluminum oxide reaction product from said battery cells, means for replacing said anodes, means for inhibiting corrosion of said anodes by said alkaline electrolyte comprising provisions for withdrawing electrolyte from said battery cells on shut-off and for maintaining a current density in excess of 10 milliamperes/cm.$^2$ during exposure of said anodes to said alkaline electrolyte, and spacing means for adjusting the spacings between said anodes and said cathodes, said spacing means comprising expandable and collapsible gaskets and spacers.

2. Power source comprising aluminum anodes and oxygen-depolarized cathodes forming parts of battery cell compartments, an alkaline electrolyte comprising between 2 and 5 moles/liter of alkali metal hydroxide, an electrolyte reservoir, electrolyte circulation means, means for removing the aluminum oxide reaction product from said battery cells, means for replacing said anodes, and means for inhibiting corrosion of said anodes by said alkaline electrolyte comprising provisions for withdrawing electrolyte from said battery cells on shut-off and for maintaining a current density in excess of 10 milliamperes/cm.$^2$ during exposure of said anodes to said alkaline electrolyte, said electrolyte containing a quaternary ammonium hydroxide with at least three methyl radicals and a long chain group of between 12 and 18 carbon atoms.

References Cited

UNITED STATES PATENTS

| | | | |
|---|---|---|---|
| 279,046 | 6/1883 | Tomkins | 136—86 |
| 1,121,771 | 12/1914 | Sokal | 136—86 |
| 2,464,267 | 3/1949 | Short | 204—67 |
| 2,716,670 | 8/1955 | Bacon | 136—86 |
| 2,921,110 | 1/1960 | Crowley et al. | 136—86 |
| 2,925,455 | 2/1960 | Eidensohn et al. | 136—86 |
| 2,976,342 | 3/1961 | Morehouse et al. | 136—86 |
| 2,982,806 | 5/1961 | Voss | 136—154 X |
| 3,043,898 | 7/1962 | Miller et al. | 136—86 |
| 3,202,546 | 8/1965 | Rightmire et al. | 136—86 |
| 3,236,692 | 2/1962 | Lewis | 136—86 |
| 2,119,857 | 6/1938 | Eppensteiner | 136—174.4 |
| 2,597,117 | 5/1952 | Schumacher et al. | 136—154 |
| 3,133,028 | 5/1964 | Channabasappa | 252—394 X |
| 3,346,604 | 10/1967 | Roberts et al. | 252—394 X |

ALLEN B. CURTIS, Primary Examiner

U.S. Cl. X.R.

136—83, 154, 164